(12) United States Patent
Tigges (10) Patent No.: US 7,173,633 B2
(45) Date of Patent: *Feb. 6, 2007

(54) METHOD AND SYSTEM FOR INVERSION OF DETAIL-IN-CONTEXT PRESENTATIONS

(75) Inventor: Mark H. A. Tigges, North Vancouver (CA)

(73) Assignee: Idelix Software Inc., Vancouver (CA)

(*) Notice: Subject to any disclaimer, the term of this patent is extended or adjusted under 35 U.S.C. 154(b) by 0 days.

This patent is subject to a terminal disclaimer.

(21) Appl. No.: 10/788,482

(22) Filed: Mar. 1, 2004

(65) Prior Publication Data

US 2004/0169667 A1    Sep. 2, 2004

Related U.S. Application Data

(63) Continuation of application No. 09/932,088, filed on Aug. 20, 2001, now Pat. No. 6,727,910.

(30) Foreign Application Priority Data

Dec. 19, 2000  (CA) .................................... 2328794
Mar. 23, 2001  (CA) .................................... 2341965

(51) Int. Cl.
*G09G 5/30* (2006.01)
(52) U.S. Cl. .................................................... 345/647
(58) Field of Classification Search ................ 345/581, 345/647, 541, 539, 619
See application file for complete search history.

(56) References Cited

U.S. PATENT DOCUMENTS

| | | | | |
|---|---|---|---|---|
| 5,048,077 A | * | 9/1991 | Wells et al. | 379/93.17 |
| 5,764,139 A | * | 6/1998 | Nojima et al. | 340/461 |
| 6,307,612 B1 | * | 10/2001 | Smith et al. | 349/157 |
| 6,747,611 B1 | * | 6/2004 | Budd et al. | 345/7 |
| 6,961,071 B2 | * | 11/2005 | Montagnese et al. | 345/647 |
| 2002/0101396 A1 | * | 8/2002 | Huston et al. | 345/87 |

* cited by examiner

*Primary Examiner*—Kee M. Tung
*Assistant Examiner*—J. Amini
(74) *Attorney, Agent, or Firm*—Joseph Conneely; McCarthy Tetrault LLP (57) ABSTRACT

In a data processing system that executes a program of instructions, a method of inverting a distorted surface in a detail-in-context presentation is provided comprising the steps of locating a first approximation point in an undistorted surface for the inversion of a point in a distorted surface, determining if the approximation point is acceptable as an inversion of the point in the distorted surface, locating a next approximation point in the undistorted surface if the first approximation point is not acceptable, and repeating this process until an acceptable approximation point is located for the inversion of the point in the distorted surface. The use of this method to obtain the distance between points on an undistorted surface from the relative distances between corresponding points on a plurality of distorted surfaces in a detail-in-context presentation is provided. A data processing system for the inversion of detail-in-context presentations is provided including an input device, a central processing unit, memory, and a display wherein said data processing system has stored therein data representing sequences of instructions which when executed cause the method described to be performed.

25 Claims, 7 Drawing Sheets

METHOD AND SYSTEM FOR INVERSION OF DETAIL-IN-CONTEXT PRESENTATIONS

This application is a continuation of U.S. patent application Ser. No. 09/932,088, filed Aug. 20, 2001, now U.S. Pat. No. 6,727,910, and incorporated herein by reference, which claims priority from Canadian Patent Application Nos. 2,328,794 and 2,341,965, filed Dec. 19, 2000 and Mar. 23, 2001, respectively, and incorporated herein by reference.

FIELD OF THE INVENTION

The invention relates to the field of computer graphics processing. More specifically, the invention relates to detail-in-context presentations and the inversion of distortions in detail-in-context presentations.

BACKGROUND OF THE INVENTION

Since the advent of video display terminals as the primary interface to the computer, making the best use of the available screen space has been a fundamental issue in user interface design. This issue has been referred to as the "screen real estate problem". The necessity for effective solutions to this problem is growing as the ability to produce and store visual information in great volumes is outstripping the rate at which display technology is advancing. One solution to the screen real estate problem is the use of detail-in-context presentation techniques. Detail-in-context presentations are useful for displaying large amounts of information on limited-size computer screens.

Now, in the detail-in-context discourse, differentiation is often made between the terms "representation" and "presentation". A representation is a formal system, or mapping, for specifying raw information or data that is stored in a computer or data processing system. For example, a digital map of a city is a representation of raw data including street names and the relative geographic location of streets and utilities. Such a representation may be displayed visually on computer screen or printed on paper. On the other hand, a presentation is a spatial organization of a given representation that is appropriate for the task at hand. Thus, a presentation of a representation organizes such things as the point of view and the relative emphasis of different parts or regions of the representation. For example, a digital map of a city may be presented with a work route magnified to reveal street names. Thus, detail-in-context presentations allow for magnification of a particular region of interest (the "focal region") in a representation while preserving visibility of the surrounding representation. In other words, in detail-in-context presentations focal regions are presented with an increased level of detail without the removal of contextual information from the original representation. In general, a detail-in-context presentation may be considered as a distorted view (or distortion) of a portion of the original representation where the distortion is the result of the application of a "lens" like distortion function to the original representation. For reference, a detailed review of various detail-in-context presentation techniques may be found in Carpendale's *A Framework for Elastic Presentation Space* (Carpendale, Marianne S. T., *A Framework for Elastic Presentation Space* (Burnaby, British Columbia: Simon Fraser University, 1999)).

One shortcoming of the prior art detail-in-context presentation methods is their inability to effectively invert distortions in a detail-in-context presentation back to an original or undistorted presentation of the representation. The ability to perform such an inversion or inverse mapping would be of great value in extending the capabilities of detail-in-context presentations to applications such as image editing. For example, the editing of a focal region in a representation may be facilitated more easily in a distorted presentation rather than in an undistorted presentation.

The ability to perform an inverse mapping is also necessary for applications involving the subsequent distortion of a previously distorted presentation. In other words, inversion would allow a presentation system user to accurately position or reposition one or more distortion producing "lenses" within a given presentation that has already been distorted. Hence, the distorted presentation ultimately viewed by the user may be the end result of a series of distortion steps wherein the individual distortion steps are not known or are difficult to invert. In fact, the need for inversion arises whenever it is necessary to position a lens based on observed coordinates in the distorted presentation. This is so because the lens may be directly generated only from coordinate information in the undistorted presentation. As such, an inversion is necessary to produce the source coordinates for generating the lens.

Moreover, inversion provides a means to calculate real distances in an undistorted presentation based on locations within one or more lenses in a corresponding distorted presentation. For example, if a user wants to know the distance in the undistorted presentation between the focal points of two separate lenses in a corresponding distorted presentation of a map, such as the distance between a current location and a destination location, this distance can be computed via inversions of the focal points of these lenses.

Several systems are known which provide techniques for converting distorted or warped three-dimensional (3D) images into corrected, undistorted, or dewarped two-dimensional (2D) images. In U.S. Pat. No. 6,005,611 (Gullichsen, et al.), a system is disclosed wherein a distorted image captured by a wide-angle or fisheye lens is corrected through the use of a specially generated polynomial transform function that maps points from the distorted image into rectangular points. A more complex transform function is described in U.S. Pat. No. 5,185,667 (Zimmerman). In U.S. Pat. No. 5,329,310 (Liljegern, et al.) a similar objective is achieved in the context of motion picture images through the use of multiple lens (camera and projector) transfer functions. The result being the ability to project an image, taken from a particular point of view, onto a screen, especially a curved wide angle screen, from a different point of view, to be viewed from the original point of view, without distortion. In U.S. Pat. No. 5,175,808 (Sayre), a method and apparatus for non-affine image warping is disclosed that uses displacement tables to represent the movement of each pixel from an original location in a source image to a new location in a warped destination image. Through these displacement tables and a resampling method, the need for inversion of the underlying transform equation that specify the distortion or warp is eliminated. Finally, in U.S. Pat. No. 4,985,849 (Hideaki), look-up tables are used in combination with the forward evaluation of the transform equation in order to avoid the step of transform equation inversion. However, none of these systems disclose a method and system for inverting distortions in a manner that is optimized for detail-in-context presentations.

A need therefore exists for a method and system that will allow for the effective inversion of distortions in detail-in-context presentations. Therefore, it is an object of the present invention to obviate or mitigate at least some of the above mentioned disadvantages.

SUMMARY OF THE INVENTION

The invention provides a method and system for the inversion of distortions in detail-in-context presentations. According to one aspect of the invention, a method is provided that allows a distortion in a detail-in-context presentation to be inverted. The method comprises the steps of locating a first approximation point in an undistorted surface for the inversion of a point in a distorted surface, determining if the approximation point is acceptable as an inversion of the point in the distorted surface, locating a next approximation point in the undistorted surface if the first approximation point is not acceptable, and repeating this process until an acceptable approximation point is located for the inversion of the point in the distorted surface. According to another aspect of the invention, the use of this method to obtain the distance between points on an undistorted surface from the relative distances between corresponding points on a plurality of distorted surfaces in a detail-in-context presentation is provided. According to another aspect of the invention, a data processing system is provided. This data processing system has stored therein data representing sequences of instructions which when executed cause the above-described method to be performed. The data processing system generally has an input device, a central processing unit, memory, and a display.

BRIEF DESCRIPTION OF THE DRAWINGS

The invention may best be understood by referring to the following description and accompanying drawings which illustrate the invention. In the drawings.

DETAILED DESCRIPTION OF THE PREFERRED EMBODIMENTS

In the following description, numerous specific details are set forth to provide a thorough understanding of the invention. However, it is understood that the invention may be practiced without these specific details. In other instances, well-known software, circuits, structures and techniques have not been described or shown in detail in order not to obscure the invention. The term data processing system is used herein to refer to any machine for processing data, including the computer systems and network arrangements described herein. The term "Elastic Presentation Space" or "EPS" is used herein to refer to techniques that allow for the adjustment of a visual presentation without interfering with the information content of the representation. The adjective "elastic" is included in the term as it implies the capability of stretching and deformation and subsequent return to an original shape. EPS graphics technology is described by Carpendale in *A Framework for Elastic Presentation Space* (Carpendale, Marianne S. T., *A Framework for Elastic Presentation Space* (Burnaby, British Columbia: Simon Fraser University, 1999)) which is incorporated herein by reference. Basically, in EPS graphics technology, a two-dimensional visual representation is placed onto a surface; this surface is placed in three-dimensional space; the surface, containing the representation, is viewed through perspective projection; and the surface is manipulated to effect the reorganization of image details. The presentation transformation is separated into two steps: surface manipulation or distortion and perspective projection.

In general, the invention described herein provides a method and system for the inversion of distortions in detail-in-context presentations. The method and system described is applicable to detail-in-context navigation within computer graphics processing systems including EPS graphics technology and to computer graphics processing systems in general.

According to one aspect of the invention, a method is described that allows a distortion in a detail-in-context presentation to be inverted. The method comprises the steps of locating a first approximation point in an undistorted surface for the inversion of a point in a distorted surface, determining if the approximation point is acceptable as an inversion of the point in the distorted surface, locating a next approximation point in the undistorted surface if the first approximation point is not acceptable, and repeating this process until an acceptable approximation point is located for the inversion of the point in the distorted surface.

According to another aspect of the invention, the use of this method to obtain the distance between points on an undistorted surface from the relative distances between corresponding points on a plurality of distorted surfaces in a detail-in-context presentation is described.

According to another aspect of the invention, a data processing system is described. This data processing system has stored therein data representing sequences of instructions which when executed cause the above-described method to be performed. The data processing system generally has an input device, a central processing unit, memory device, and a display.

Figure 6:
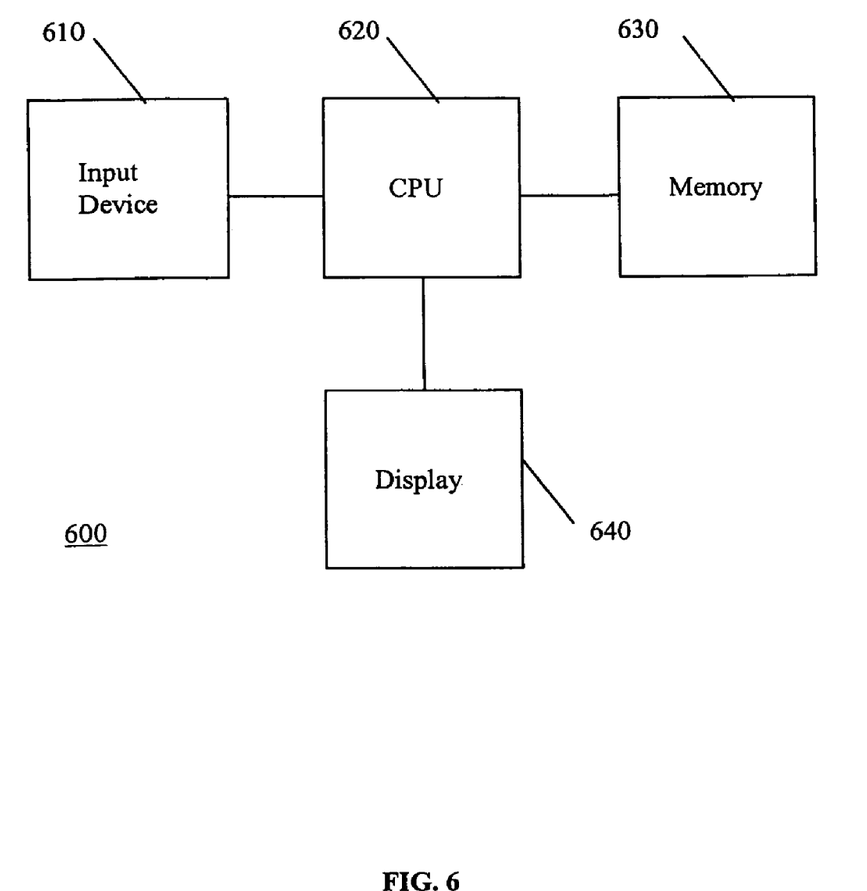
FIG. 6 is a block diagram of a data processing system in accordance with the preferred embodiment.

Referring to FIG. 6, there is shown a block diagram of an exemplary data processing system 600 according to one embodiment of the invention. The data processing system is suitable for implementing BPS graphics technology. The data processing system 600 includes an input device 610, a central processing unit or CPU 620, memory 630, and a display 640. The input device 610 may be a keyboard, mouse, trackball, or similar device. The CPU 620 may include dedicated coprocessors and memory devices. The memory 630 may include RAM, ROM, databases, or disk devices (e.g., a computer program product). And, the display 640 may include a computer screen or terminal device. The data processing system 600 has stored therein data representing sequences of instructions (e.g., code) which when executed cause the method described herein to be performed. Of course, the data processing system 600 may contain additional software and hardware a description of which is not necessary for understanding the invention.

Referring to FIGS. 1 through 7 the method of one embodiment of the invention will now be described. With this method, a point in an undistorted presentation or data space is found, which when distorted, yields a specified point in a distorted presentation or data space. Then, if desired, the inversion of the entire distorted presentation or data space to an original undistorted presentation or data space may be obtained as the inverse mapping of the locus of points in the distorted presentation or data space. The method is iterative and makes use of the distortion process itself as a component in an approximation technique for computing the inverse of the distortion.

Figure 1:
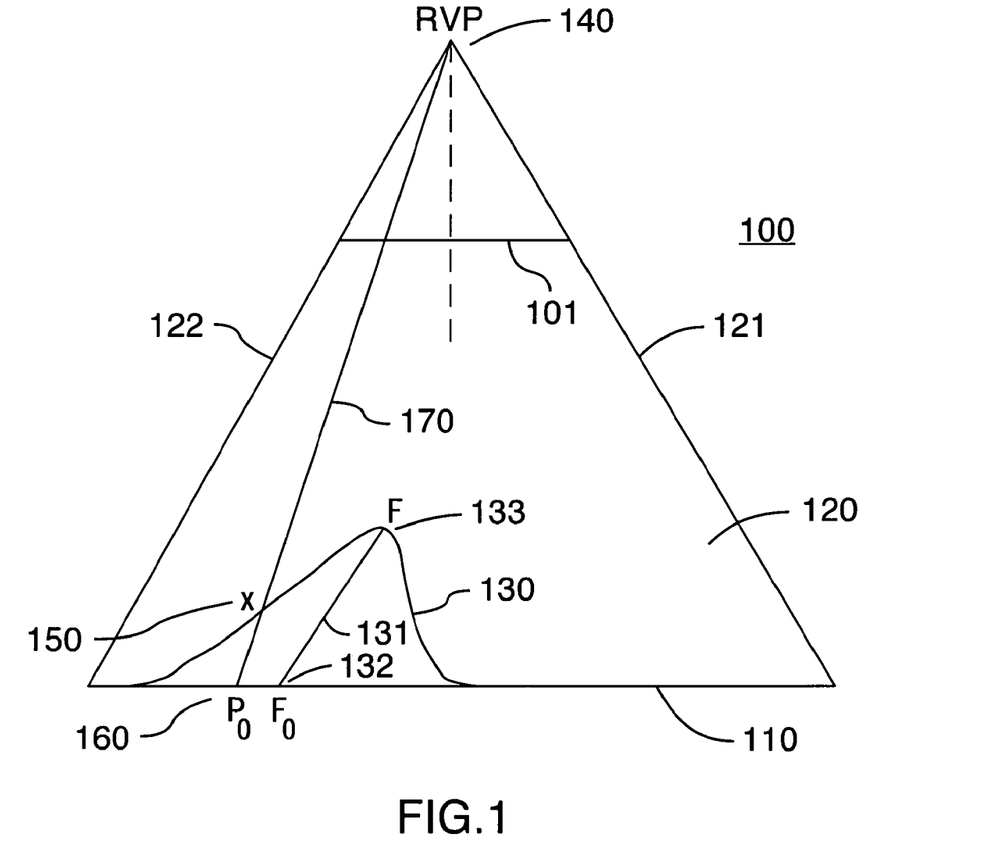
FIG. 1 is a cross-sectional view of a presentation illustrating a point X on a distorted surface and a first approximation point $P_o$ for its inversion back to an original basal plane in accordance with the preferred embodiment.

Referring to FIG. 1, there is shown a cross-sectional view of a presentation 100 in accordance with EPS graphics technology and in accordance with the preferred embodiment. EPS graphics technology employs viewer-aligned perspective projections to produce detail-in-context presentations in a reference view plane 101 which may be viewed on a display 640. Undistorted two-dimensional (2D) data points are located in a basal plane 110 of a three-dimensional (3D) perspective viewing volume 120 which is defined by extreme rays 121 and 122 and the basal plane 110. A reference viewpoint (RVP) 140 is located above the centre point of the basal plane 110 and reference view plane 101. Points in the basal plane 110 are displaced upward onto a distorted surface 130 which is defined by a general three-dimensional distortion function D. The direction of the viewer-aligned perspective projection corresponding to the distorted surface 130 is indicated by the line $F_o$-F 131 drawn from a point $F_o$ 132 in the basal plane 110 through the point F 133 which corresponds to the focus or focal region of the distorted surface 130. The method of the present invention locates a point $P_i$ in the basal plane 110 that corresponds to a point X 150 on the distorted surface 130 through a series of steps, involving iteration and approximation, as follows. Successive approximations of the point $P_i$ are represented by the subscript i where i≧0.

Figure 7:
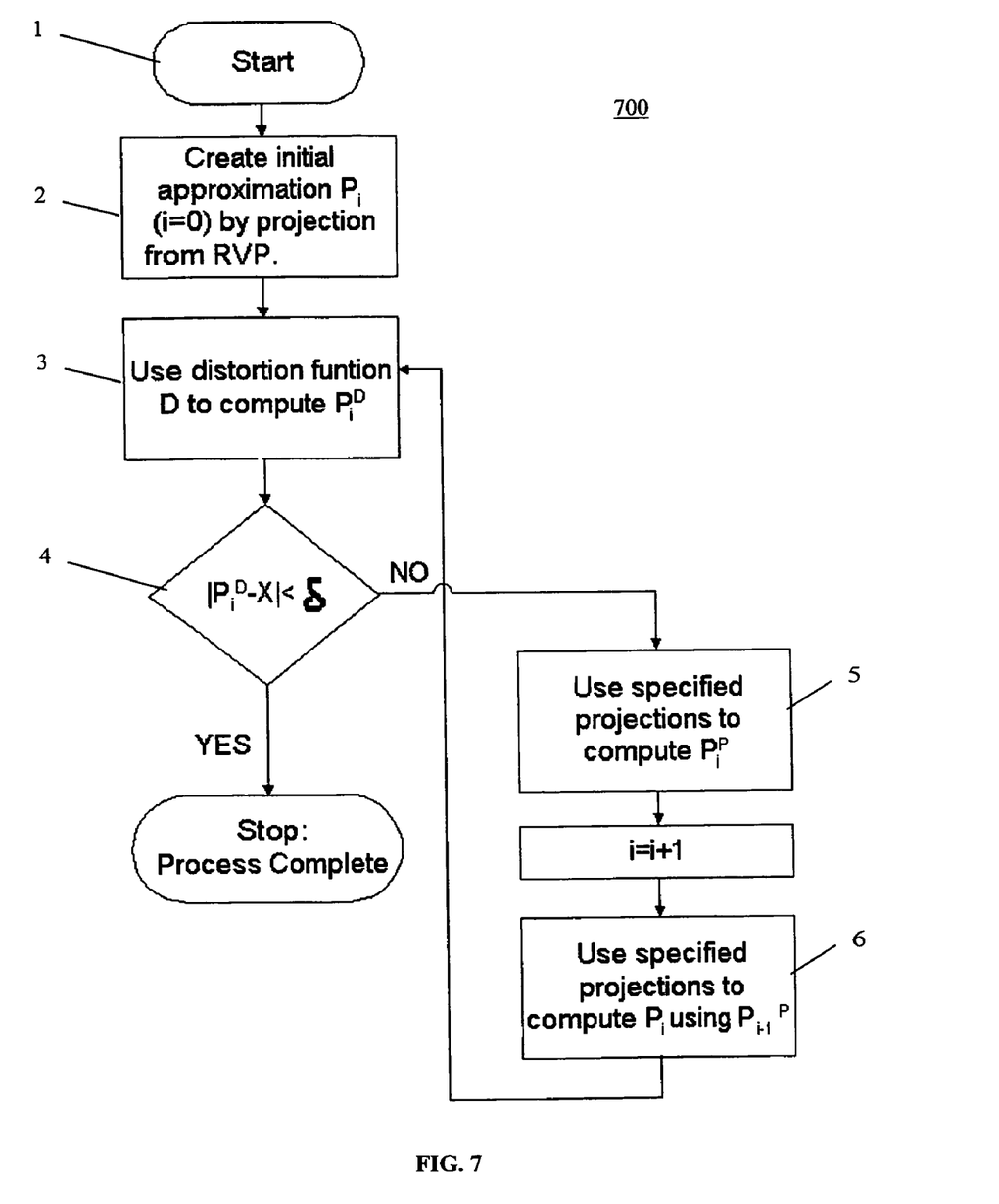
FIG. 7 is a flow chart illustrating an iterative method for inversion in accordance with the preferred embodiment.

Referring to FIG. 7, where there is shown a flow chart 700 illustrating the method of one embodiment of the invention, and again referring to FIG. 1, at step 1, an acceptable tolerance δ is selected for the magnitude of the difference between the point X 150 on the distorted surface 130 and the point $P_i^D$, where $P_i^D$ represents the result of the mapping of a point $P_i$ in the basal plane 110 onto the distorted surface 130 through the function D. The value of δ is application dependent. For example, an acceptable δ could be less than half the width of a pixel for a typical display surface such as a monitor 640. In general, successive approximations of the point $P_i$ will continue until the magnitude of the difference between the point X 150 and the point $P_i^D$ is less than δ, that is, until $|P_i^D-X|<\delta$.

At step 2, a first approximation point $P_o$ 160 for the inversion of X 150 is located at the intersection point in the basal plane 110 of a line RVP-X 170 drawn through RVP 140, X 150, and the basal plane 110. Here, i=0.

Figure 2:
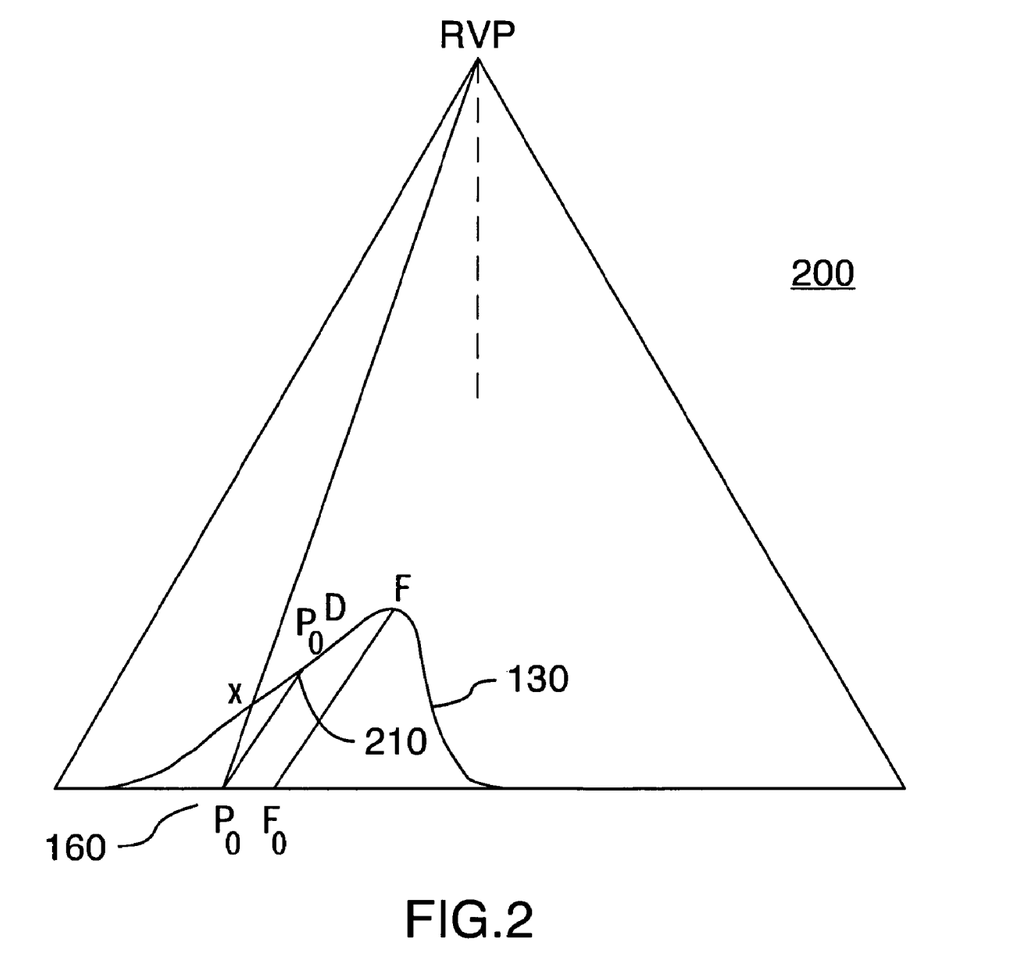
FIG. 2 is a cross-sectional view of a presentation illustrating the displacement of a first approximation point $P_o$ onto a distorted surface by application of a distortion function D resulting in a point $P_o^D$ in accordance with the preferred embodiment.

Referring to FIG. 2, at step 3, point $P_o$ 160 is displaced onto the distorted surface 130 by the application of D. The resultant point on the distorted surface 130 is represented by $P_o^D$ 210.

At step 4, the magnitude of the difference between the point X 150 and the point $P_o^D$ 210 is calculated. If $|P_o^D-X|<\delta$, then an acceptable value for the inversion of the point X 150 will have been found and the method is complete for the point X 150. The method may then proceed with the inversion of another point on the distorted surface 130. If $|P_o^D-X|>\delta$, then the method will continue and will generate a next approximation for the inversion of the point X 150.

Figure 3:
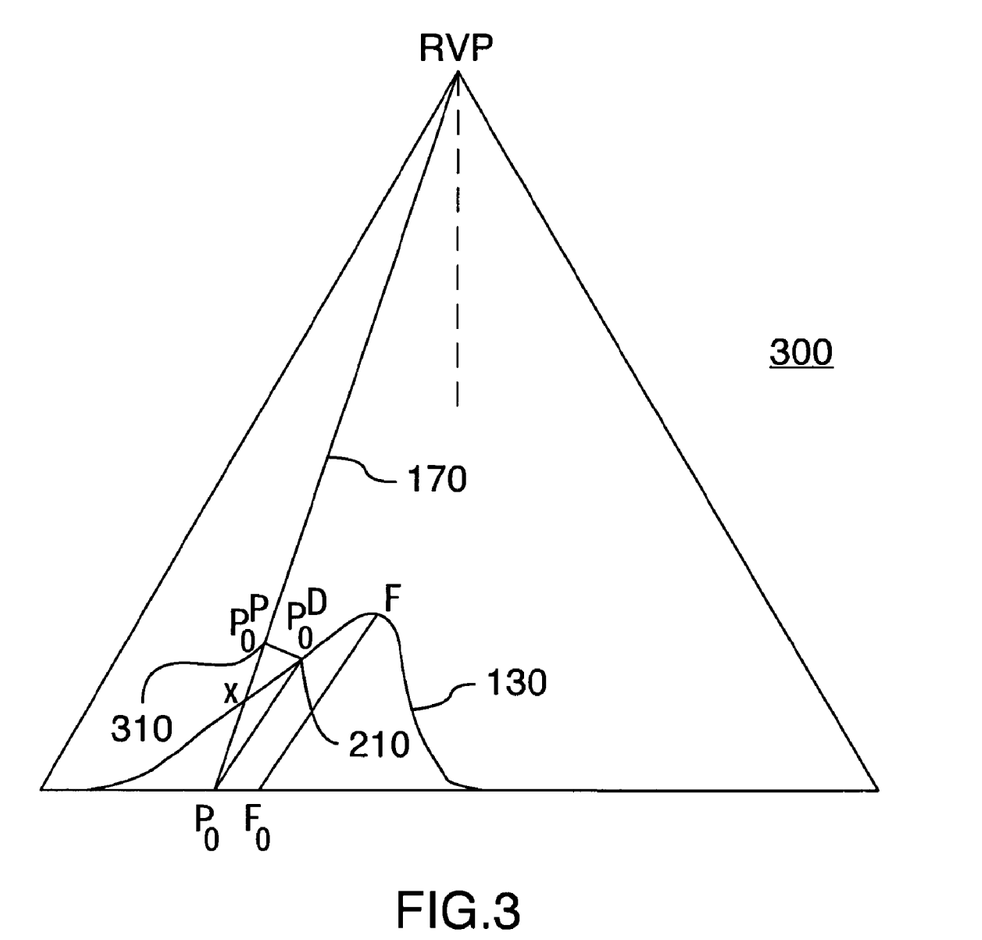
FIG. 3 is a cross-sectional view of a presentation illustrating the projection of a point $P_o^D$ onto a line RVP-X resulting in a point $P_o^P$ in accordance with the preferred embodiment.

Referring to FIG. 3, at step 5, the point $P_o^D$ 210 is projected onto the line RVP-X 170 to locate the point $P_o^P$ 310 which is the closest point to $P_o^D$ 210 on the line RVP-X 170.

Figure 4:
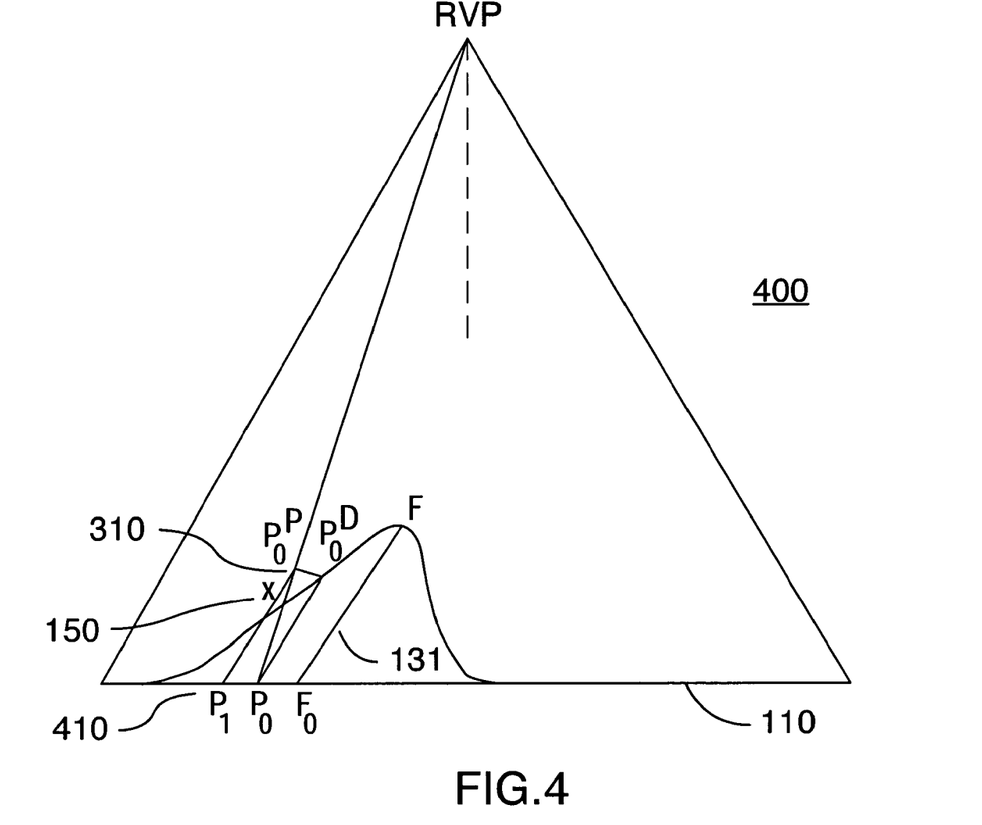
FIG. 4 is a cross-sectional view of a presentation illustrating the projection of a point $P_o^P$ onto a basal plane resulting in a second approximation point $P_1$ and a corresponding displaced point $P_1^D$ in accordance with the preferred embodiment.

Referring to FIG. 4, at step 6, the point $P_o^P$ 310 is projected onto the basal plane 110 to produce the next approximation $P_1$ 410 for the inversion of the point X 150. This projection is made in the direction parallel to a line F-$F_o$, that is, in the direction from point F 133 to point $F_o$ 132 parallel to the line $F_o$-F 131. Alternately, this direction can also be established by applying the distortion function D to any point in the basal plane within the lens extent (as defined by the distortion function D). The direction of the displacement of such a point by the distortion function D will be antiparallel to the line F-$F_o$. The point $P_1$ 410 is thus located on the basal plane 110 at the point of intersection of the basal plane 110 and a line 420 drawn parallel to the line $F_o$-F 131 and passing through the point $P_o^P$ 310. Now, i=1 and a second iteration may begin from step 3.

Figure 5:
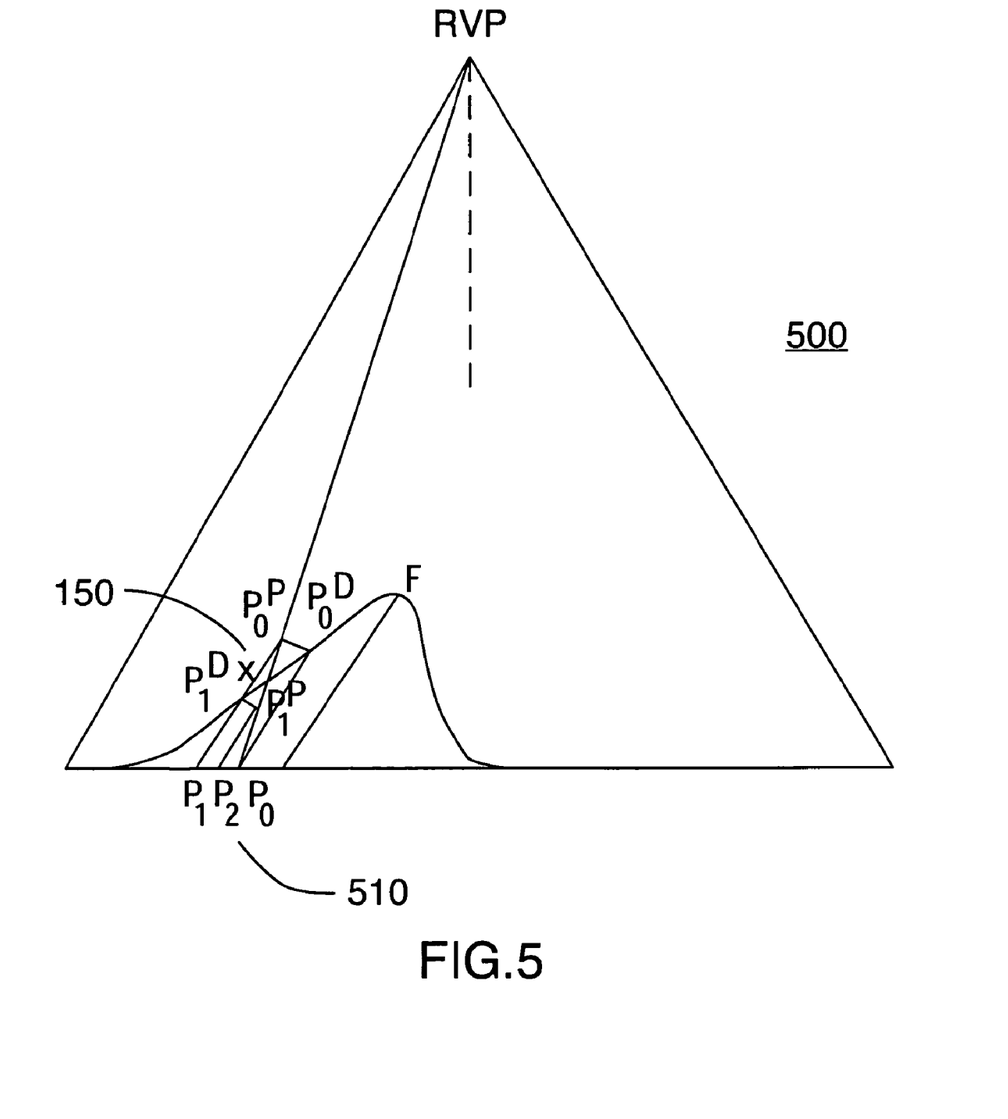
FIG. 5 is a cross-sectional view of a presentation illustrating the projection of a point $P_1^D$ onto a line RVP-X resulting in a point $P_1^P$ which is then projected onto a basal plane resulting in a third approximation point $P_2$ in accordance with the preferred embodiment.

Referring to FIG. 5, a second iteration is illustrated resulting in point $P_2$ 510 as an approximation of the inversion of the point X 150.

Again referring to FIG. 1, in certain cases such as folding, which is the lateral displacement of a focal region 133 through shearing of the viewer-aligned vector defining the direction of distortion 131, it is possible for successive approximations for $P_i$ to diverge. This may be caused, for example, by a fold in which a undistorted area of the basal plane 110 is hidden by a portion of the distorted surface when viewed from RVP 140 such that a line drawn through RVP 140, the distorted surface, and the basal plane 110 intersects the distorted surface at multiple points. In these circumstances, a bisection of approximation points $P_i$ may be used to search for the desired intersection of RVP-X 170 with the basal plane 110.

The method of the embodiment of the invention described above may be used to obtain the distance between points on an undistorted surface from the relative distances between corresponding points on one or more distorted surfaces in a detail-in-context presentation. For example, if one point is selected on a first distorted surface and a second point is selected on a second distorted surface, both surfaces being contained in a detail-in-context presentation, then the distance between these two points on the undistorted surface may be found by first inverting each point on each distorted surface, using the method of the invention, to obtain corresponding points on the undistorted surface. Then, the required distance may be calculated as the magnitude of the difference between the two inverted points.

To reiterate and expand, the method and system of the present invention includes the following unique features and advantages: it facilitates the location of a point in an undistorted presentation which, when distorted, yields a specified point in a distorted presentation and then, from this point, the inversion of the entire distorted presentation back to the original undistorted presentation may be accomplished through the inverse mapping of the locus of the points in the distorted presentation; it employs an iterative approach to inversion to facilitate general distortion functions; in other words, having knowledge of the location of the point to be inverted in the distorted presentation and through an iterative process, it computes a series of points in the undistorted presentation space until a point is found, which when displaced by a general distortion function, yields a point that is coincident with the point to be inverted in the distorted presentation; it is not specific to a particular distortion function or transform equation; it does not require the maintenance of a copy of the undistorted presentation in computer memory; it does not use look-up tables and hence does not put unacceptable demands on computing system resources, including memory, especially for undistorted presentations that are large in size; and, it may be used to obtain the distance between points in an undistorted presentation from the relative distances between corresponding points on one or more distorted surfaces in a detail-in-context presentation.

Although the invention has been described with reference to certain specific embodiments, various modifications thereof will be apparent to those skilled in the art without departing from the spirit and scope of the invention as outlined in the claims appended hereto.

What is claimed is:

1. In a data processing system that executes a program of instructions, a method for inverting a point X on a distorted surface in a detail-in-context presentation for display on a display screen, comprising the steps of:
   (a) locating a first approximation point $P_i$, for an inversion of the point X, wherein the point $P_i$ is on an undistorted surface; and,
   (b) obtaining a point $P_i^D$ by displacing the point $P_i$, onto the distorted surface by applying a distortion function D; calculating a magnitude of the difference $|P_i^D-X|$ between the point X and the point $P_i^D$; determining whether the point $P_i$ is acceptable for the inversion of the point X by comparing the magnitude of the difference to a tolerance $\delta$; and, displaying the point $P_i$ on the display screen if the point $P_i$ is acceptable for the inversion of the point X.

2. The method of claim 1 and further comprising the steps of:
   (c) locating a next approximation point $P_{i+1}$ for the inversion of the point X if the approximation point $P_i$ is not acceptable for the inversion of the point X; and,
   (d) repeating steps (b) and (c) until the approximation point is acceptable for the inversion of the point X.

3. The method of claim 2 and further comprising the step of selecting the tolerance $\delta$.

4. The method of claim 3 wherein the tolerance $\delta$ is a fraction of a width of a pixel for a computer display surface.

5. The method of claim 4 wherein the fraction includes one-half.

6. The method of claim 1 wherein the undistorted surface is included in the detail-in-context presentation.

7. The method of claim 2 and further comprising the step of constructing a line RVP-X from a point RVP above the undistorted surface, through the point X, and through the undistorted surface to locate the first approximation point $P_i$ at a point of intersection of the line RVP-X and the undistorted surface.

8. The method of claim 7 wherein the point RVP is a reference viewpoint for the detail-in-context presentation.

9. The method of claim 8 and further comprising the steps of:
   projecting the point $P_i^D$ onto the line RVP-X to locate a point $P_i^P$, wherein the point $P_i^P$, is a closest point to the point $P_i^D$ on the line RVP-X; and,
   projecting the point $P_i^P$ onto the undistorted surface in a direction opposite to that of a displacement due to distortion to locate the next approximation point $P_{i+1}$ for the inversion of the point X, wherein the displacement due to distortion is given by a line $F_o$- F constructed through the undistorted surface and a focus F of the distorted surface, and wherein the point $P_{i+1}$ is located on the undistorted surface at a point of intersection of the undistorted surface and a line constructed parallel to the line $F_o$- F and passing through the point $P_i^P$.

10. The method of claim 2 and further comprising the step of bisecting the point $P_i$ to counter divergence in successive approximations of the point $P_i$ due to folds or discontinuities in the distorted surface.

11. The method of claim 1 wherein the undistorted surface is a plane.

12. The method of claim 1 wherein the distorted surface is defined by the distortion function D.

13. The method of claim 12 wherein the distortion function D is an n-dimensional function, wherein n is an integer greater than zero.

14. The method of claim 13 wherein the distortion function D is a three-dimensional function.

15. The method of claim 12 wherein the distortion function D is a lens function.

16. A system for inverting a point X on a distorted surface in a detail-in-context presentation, the system having memory, a display, and an input device, the system comprising:
   a processor coupled to the memory, display, and input device and adapted for:
   (a) locating a first approximation point $P_i$ for an inversion of the point X, wherein the point $P_i$ is on an undistorted surface; and,
   (b) obtaining a point $P_i^D$ by displacing the point $P_i$ onto the distorted surface by applying a distortion function D; calculating a magnitude of the difference $|P_i^D-X|$ between the point X and the point $P_i^D$; determining whether the point $P_i$ is acceptable for the inversion of the point X by comparing the magnitude of the difference to a tolerance $\delta$; and, displaying the point $P_i$ on the display if the point $P_i$, is acceptable for the inversion of the point X.

17. The system of claim 16 wherein said processor is further adapted for:
   (c) locating a next approximation point $P_{i+1}$ for the inversion of the point X if the approximation point $P_i$ is not acceptable for the inversion of the point X; and,
   (d) repeating (b) and (c) until the approximation point is acceptable for the inversion of the point X.

18. A computer program product having a computer readable medium tangibly embodying computer executable code for directing a data processing system to invert a point X on a distorted surface in a detail-in-context presentation for display on a display screen, the computer program product comprising:
   code for (a) locating a first approximation point $P_i$ for an inversion of the point X, wherein the point $P_i$ is on an undistorted surface; and,
   code for (b) obtaining a point $P_i^D$ by displacing the point $P_i$ onto the distorted surface by applying a distortion function D; calculating a magnitude of the difference $|P_i^D-X|$ between the point X and the point $P_i^D$; determining whether the point $P_i$, is acceptable for the inversion of the point X by comparing the magnitude of the difference to a tolerance $\delta$; and, displaying the point $P_i$ on the display screen if the point $P_i$ is acceptable for the inversion of the point X.

19. The computer program product of claim 18 and further comprising:

code for (c) locating a next approximation point $P_{i+1}$ for the inversion of the point X if the approximation point $P_i$ is not acceptable for the inversion of the point X; and, code for (d) repeating (b) and (c) until the approximation point is acceptable for the inversion of the point X.

20. In a data processing system that executes a program of instructions, a method for determining a distance on an undistorted surface between a first point $X_1$ and a second point $X_2$ on a distorted surface in a detail-in-context presentation for display on a display screen, comprising:

inverting the point $X_1$ by:

locating a first approximation point $P_{i1}$ for an inversion of the point $X_1$, wherein the point $P_{i1}$ is on the undistorted surface; and, obtaining a point $P_{i1}^D$ by displacing the point $P_{i1}$ onto the distorted surface by applying a distortion function D; calculating a magnitude of the difference $|P_{i1}^{D-X_1}|$ between the point $X_1$ and the point $P_{i1}^D$; and, determining whether the point $P_{i1}$ is acceptable for the inversion of the point $X_1$ by comparing the magnitude of the difference $|P_{i1}^D-X_1|$ to a tolerance $\delta$;

inverting the point $X_2$ by:

locating a first approximation point $P_{i2}$ for an inversion of the point $X_2$, wherein the point $P_{i2}$ is on the undistorted surface; and, obtaining a point $P_{i2}^D$ by displacing the point $P_{i2}$ onto the distorted surface by applying a distortion function D; calculating a magnitude of the difference $|P_{i2}^D-X_2|$ between the point $X_2$ and the point $P_{i2}^D$; and, determining whether the point $P_{i2}$ is acceptable for the inversion of the point $X_2$ by comparing the magnitude of the difference $|P_{i2}^D-X_2|$ to the tolerance $\delta$;

calculating a magnitude of the difference $|P_{i1}-P_{i2}|$ between the approximation points $P_{i1}$ and $P_{i2}$; and, displaying the magnitude of the difference $|P_{i1}-P_{i2}|$ on the display screen.

21. The method of claim 20 wherein the first point $X_1$ is on a first disported surface defined by a first distortion function $D_1$ and the second point $X_2$ is on a second distorted surface defined by a second distortion function $D_2$.

22. In a data processing system that executes a program of instructions, a method for inverting a point X on a distorted surface in a detail-in-context presentation for display on a display screen, comprising the steps of:

(a) locating a first approximation point $P_i$ for an inversion of the point X, wherein the point $P_i$ is on an undistorted surface;

(b) obtaining a point $P_i^D$ by displacing the point $P_i$ onto the distorted surface by applying a distortion function D; calculating a magnitude of the difference $|P_i^D-X|$ between the point X and the point $P_i^D$; and, determining whether the point $P_i$ is acceptable for the inversion of the point X by comparing the magnitude of the difference to a tolerance $\delta$;

(c) locating a next approximation point $P_{i+1}$ for the inversion of the point X if the approximation point $P_i$, is not acceptable for the inversion of the point X by: constructing a line RVP-X from a point RVP above the undistorted surface, through the point X, and through the undistorted surface to locate the first approximation point $P_i$ at a point of intersection of the line RVP-X and the undistorted surface, wherein the point RVP is a reference viewpoint for the detail-in-context presentation; projecting the point $P_i^D$ onto the line RVP-X to locate a point $P_i^P$, wherein the point $P_i^P$ is a closest point to the point $P_i^D$ on the line RVP-X; and, projecting the point $P_i^P$ onto the undistorted surface in a direction opposite to that of a displacement due to distortion to locate the next approximation point $P_{i+1}$ for the inversion of the point X, wherein the displacement due to distortion is given by a line $F_o$- F constructed through the undistorted surface and a focus F of the distorted surface, and wherein the point $P_{i+1}$ is located on the undistorted surface at a point of intersection of the undistorted surface and a line constructed parallel to the line $F_o$- F and passing through the point $P_i^P$;

(d) repeating steps (b) and (c) until the approximation point is acceptable for the inversion of the point X; and, (e) displaying the approximation point on the display screen.

23. A computer program product having a computer readable medium tangibly embodying computer executable code for directing a data processing system to invert a point X on a distorted surface in a detail-in-context presentation for display on a display screen, the computer program product comprising:

code for (a) locating a first approximation point $P_i$ for an inversion of the point X, wherein the point $P_i$ is on an undistorted surface;

code for (b) obtaining a point $P_i^D$ by displacing the point $P_i$ onto the distorted surface by applying a distortion function D; calculating a magnitude of the difference $|P_i^D-X|$ between the point X and the point $P_i^D$; and, determining whether the point $P_i$ is acceptable for the inversion of the point X by comparing the magnitude of the difference to a tolerance $\delta$;

code for (c) locating a next approximation point $P_{i+1}$ for the inversion of the point X if the approximation point $P_i$ is not acceptable for the inversion of the point X;

code for (d) repeating (b) and (c) until the approximation point is acceptable for the inversion of the point X; and, code for (e) displaying the approximation point on the display screen.

24. In a data processing system that executes a program of instructions, a method for inverting a point X on a distorted surface in a detail-in-context presentation for display on a display screen, comprising the steps of:

(a) locating a first approximation point $P_i$ for an inversion of the point X, wherein the point $P_i$ is on an undistorted surface;

(b) obtaining a point $P_i^D$ by displacing the point $P_i$ onto the distorted surface by applying a distortion function D; calculating a magnitude of the difference $|P_i^D-X|$ between the point X and the point $P_i^D$; and, determining whether the point $P_1$ is acceptable for the inversion of the point X by comparing the magnitude of the difference to a tolerance $\delta$;

(c) locating a next approximation point $P_{i+1}$ for the inversion of the point X if the approximation point $P_i$ is not acceptable for the inversion of the point X; and, (d) repeating steps (b) and (c) until the approximation point is acceptable for the inversion of the point X; and, (e) displaying the approximation point on the display screen.

25. A system for inverting a point X on a distorted surface in a detail-in-context context presentation, the system having memory, a display, and an input device, the system comprising:

a processor coupled to the memory, display, and input device and adapted for:

(a) locating a first approximation point $P_i$ for an inversion of the point X, wherein the point $P_i$ is on an undistorted surface;

(b) obtaining a point $P_i^D$ by displacing the point $P_i$ onto the distorted surface by applying a distortion function D; calculating a magnitude of the difference $|P_i^D - X|$ between the point X and the point $P_i^D$; and, determining whether the point $P_i$ is acceptable for the inversion of the point X by comparing the magnitude of the difference to a tolerance $\delta$;

(c) locating a next approximation point $P_{i+1}$ for the inversion of the point X if the approximation point $P_i$ is not acceptable for the inversion of the point X; and, (d) repeating (b) and (c) until the approximation point is acceptable for the inversion of the point X; and, (e) displaying the approximation point on the display.

* * * * *

UNITED STATES PATENT AND TRADEMARK OFFICE
CERTIFICATE OF CORRECTION

PATENT NO. : 7,173,633 B2
APPLICATION NO. : 10/788482
DATED : February 6, 2007
INVENTOR(S) : Mark H. A. Tigges et al.

It is certified that error appears in the above-identified patent and that said Letters Patent is hereby corrected as shown below:

1. Claim 1, column 7, line 25: Delete the comma "," after the expression "$P_i$".

2. Claim 1, column 7, line 28: Delete the comma "," after the expression "$P_i$".

3. Claim 9, column 7, line 63: Delete the comma "," after the second occurrence of the expression "$P_i^P$".

4. Claim 16, column 8, line 41: Delete the comma "," after the expression "$P_i$".

5. Claim 20, column 9, line 20: Replace the expression "$| P_{i1}^{D-X}{}_1 |$" with the expression --$| P_{i1}^D - X_1 |$--.

6. Claim 20, column 9, line 39: Replace the word "maanitude" with the word --magnitude--.

7. Claim 21, column 9, line 42: Replace the word "disported" with the word --distorted--.

8. Claim 22, column 9, line 55: Replace the word "detennining" with the word --determining--.

UNITED STATES PATENT AND TRADEMARK OFFICE
CERTIFICATE OF CORRECTION

| | |
|---|---|
| PATENT NO. | : 7,173,633 B2 |
| APPLICATION NO. | : 10/788482 |
| DATED | : February 6, 2007 |
| INVENTOR(S) | : Mark H. A. Tigges et al. |

It is certified that error appears in the above-identified patent and that said Letters Patent is hereby corrected as shown below:

9.  Claim 22, column 9, line 60: Delete the comma "," after the expression "$P_i$".

Signed and Sealed this

Twenty-seventh Day of May, 2008

JON W. DUDAS
*Director of the United States Patent and Trademark Office*